US008939378B2

(12) United States Patent
Huang et al.

(10) Patent No.: US 8,939,378 B2
(45) Date of Patent: Jan. 27, 2015

(54) SMARTCARD CONNECTOR WITH RFID MODULE

(75) Inventors: Cheng-Wei Huang, Taipei (TW); Hsiang-Yueh Wang, Taipei (TW)

(73) Assignee: Tyco Electronics Holdings (Bermuda) No. 7 Ltd, Pembroke (BM)

( * ) Notice: Subject to any disclaimer, the term of this patent is extended or adjusted under 35 U.S.C. 154(b) by 56 days.

(21) Appl. No.: 13/524,373

(22) Filed: Jun. 15, 2012

(65) Prior Publication Data

US 2012/0318876 A1 Dec. 20, 2012

(30) Foreign Application Priority Data

Jun. 17, 2011 (CN) ...................... 2011 2 0205636 U

(51) Int. Cl.
*G06K 19/06* (2006.01)
*G06K 7/00* (2006.01)

(52) U.S. Cl.
CPC .................................... *G06K 7/0034* (2013.01)
USPC ........................................................ 235/492

(58) Field of Classification Search
CPC .................. G06K 19/0723; G06K 19/07732; G06K 19/07769; G06K 19/0701; G06K 19/07749; G06K 7/0008; G06Q 20/204; H04Q 3/0025
USPC .......................................................... 235/492
See application file for complete search history.

(56) References Cited

U.S. PATENT DOCUMENTS

| 2008/0099559 A1* | 5/2008 | Lo et al. .......................... 235/441 |
| 2008/0311849 A1* | 12/2008 | Washiro ........................ 455/41.1 |
| 2009/0159657 A1* | 6/2009 | Chen et al. ..................... 235/375 |
| 2010/0156749 A1* | 6/2010 | Kim et al. ...................... 343/866 |

FOREIGN PATENT DOCUMENTS

TW 345435 U 11/2008

* cited by examiner

*Primary Examiner* — Thien M Le
*Assistant Examiner* — Tae Kim
(74) *Attorney, Agent, or Firm* — Barley Snyder

(57) ABSTRACT

The present invention relates to a smartcard connector with RFID module, wherein the smartcard connector is integrated with a RFID module for providing the functions of radio frequency identification and smartcard reading simultaneously. The smartcard connector with RFID module comprises a base having a card slot for receiving a smartcard, and the four corners on upper surface of the base have four support portions; a wave absorption material positioned on top of the upper surface of the base; a RFID module positioned on top of the four support portions of the base and spaced from the wave absorption material with a predetermined interval; a first transmission element connected to one side of the base; and a second transmission element connected to one side of the RFID module.

6 Claims, 3 Drawing Sheets

US 8,939,378 B2

SMARTCARD CONNECTOR WITH RFID MODULE

CROSS-REFERENCE TO RELATED APPLICATIONS

This application claims the benefit of the filing date under 35 USC. §119(a)-(d) of Chinese Utility Model Patent Application No. 201120205636.1, filed Jun. 17, 2011.

FIELD OF THE INVENTION

The present invention relates to a smartcard connector, and more particularly, to a smartcard connector with RFID module.

BACKGROUND

A conventional smartcard connector receives a smartcard, such as telephone card, bank card, credit card, and establishes an electrical connection with an electronic device for data transmission. The body of a conventional smartcard connector is mostly a base, which has a card slot inside for receiving a smartcard. The entire smartcard connector base is configured on a frame of an electronic device, such as notebook, mobile phone or card reader to achieve electrical connection with the electronic device.

Most of the current electronic devices are arranged for multiple functions, and preferably are of light, slim, short and compact shape. Thus, a major task for designers to configure various functional devices on an electronic device having limited space. Some manufactures have attempted to integrate an RFID (Radio Frequency Identification) module with a smartcard connector to save the configuration space. For example, Taiwan Utility Model Patent No. M345435 discloses a plug-in communication device, in which the structure comprises a radio frequency (RF) module and a plug-in section. The plug-in section may be inserted with a corresponding information device, and the RF module may receive a wireless signal or transmit the signal to a corresponding external device. However, the above-mentioned prior art does not specifically indicate the relative configuration relation between the plug-in section and the RF module. Generally, the RFID module and the smartcard connector may have different dimensions and specifications, so it is very difficult to be integrated. It is also a big challenge for the designers that the antenna induction performance may is kept excellent after integration of the RFID module and the smartcard connector.

SUMMARY

According to the above-mentioned required functions for a smartcard connector, the present invention provides a smartcard connector with RFID module. The connector is integrated with an RFID module for providing the functions of radio frequency identification and smartcard reading simultaneously.

The smartcard connector with RFID module according to the present invention comprises a base having a card slot for receiving a smartcard and an upper surface; a wave absorption material positioned on the upper surface of the base; an RFID module supported by the base and spaced from the wave absorption material; a first transmission element connected to one side of the base; and a second transmission element connected to one side of the RFID module.

BRIEF DESCRIPTION OF THE DRAWINGS

The system and method of the present invention may be further realized by referring the following figures and description. The embodiments not described in details in the context and without limitation may be referred to the description of the following figures. The composition elements in the figures may not be necessarily in scale, but are used to describe the principle of the present utility model in an emphasized manner. In the figures, the identical elements are labeled with the same corresponding portion in different figures.

DETAILED DESCRIPTION OF THE EMBODIMENT(S)

Figure 1:
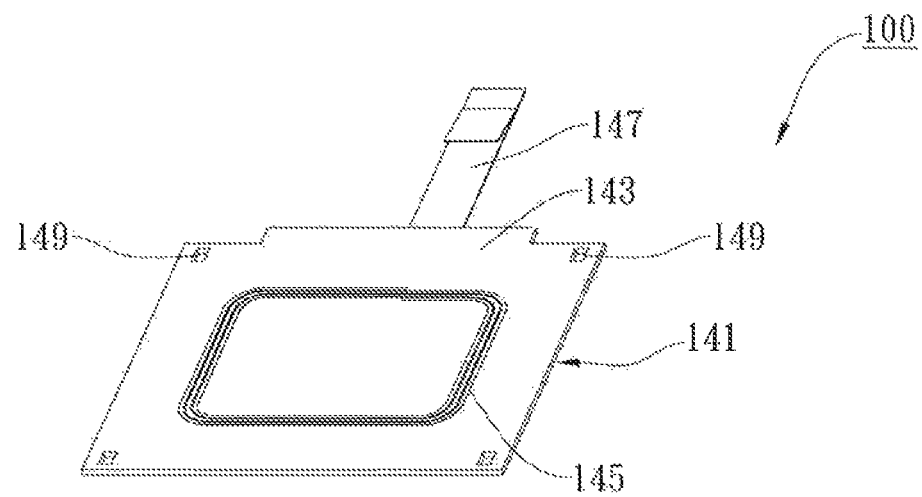
FIG. 1 is an exploded perspective view of a smartcard connector with an RFID module constructed in accordance with the present invention.
Figure 1:
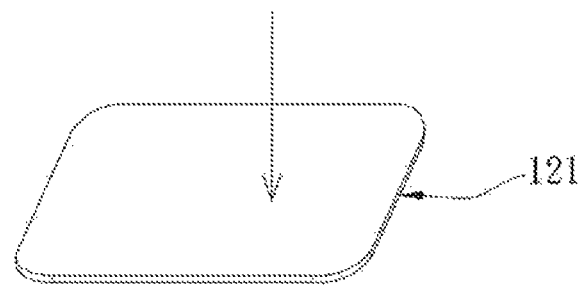
Figure 1:
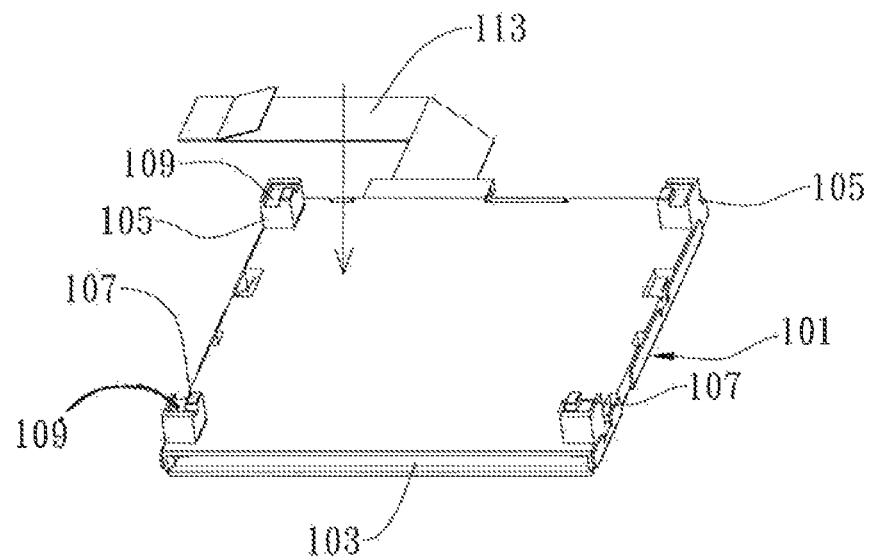

The various aspects according to the present invention are described in the following context by referring to the drawings which illustrate a preferred embodiment of the invention. In this way, as expected, the shapes in the figures may be different based on manufacturing techniques, designs and/or tolerances. Thus, various aspects described in the context of the present invention should not be construed to limit the structure of the present invention to specific elements or shapes, but should include alternative elements and shapes.

As shown in FIG. 1, a smartcard connector 100 with an RFID module, the smartcard connector 100 includes a base 101, a wave absorption material 121 and an RFID module 141. The base 101 is the main component of the smartcard connector with a flat cube shape for providing support for the structure of the smartcard connector 100. The interior of the base 101 may be defined by a card slot 103 for receiving a smartcard.

In one aspect of the present invention, the four corners on the upper surface of the base 101 are formed as four column support portions 105. The support portions 105 extend for a predetermined distance from the upper surface of the base 101 in a direction perpendicular to the upper surface. The top of each support portion 105 is formed with a raised buckle 107 and a slot 109. The raised buckle 107 and the slot 109 may be used in the following assembly procedure. It should be noted that, in other aspects of embodiments, the support portions 105 may also possibly be configured at other positions on the upper surface, not limited at the corners, and the number thereof may also be other than the four that is illustrated. The structure with single support portion may also be applied in the present invention, depending on the design of the connector.

In the embodiment illustrated, the rear side of the base 101 is connected with a first transmission element 113, such as a flexible flat cable (FFC) or a flexible printed circuit (FPC), for transmitting data signals into or out of the smartcard inserted in the card slot 103. In other embodiments, the first transmission element 113 may possibly be a solder wire. In this configuration, the entire base 101 may be directly fixed on a circuit board or another connector (not shown) by a wire bonding method. The first transmission element 113 may be other types of connectors that achieve a plate-to-plate connection and transmission aspect.

Figure 2:
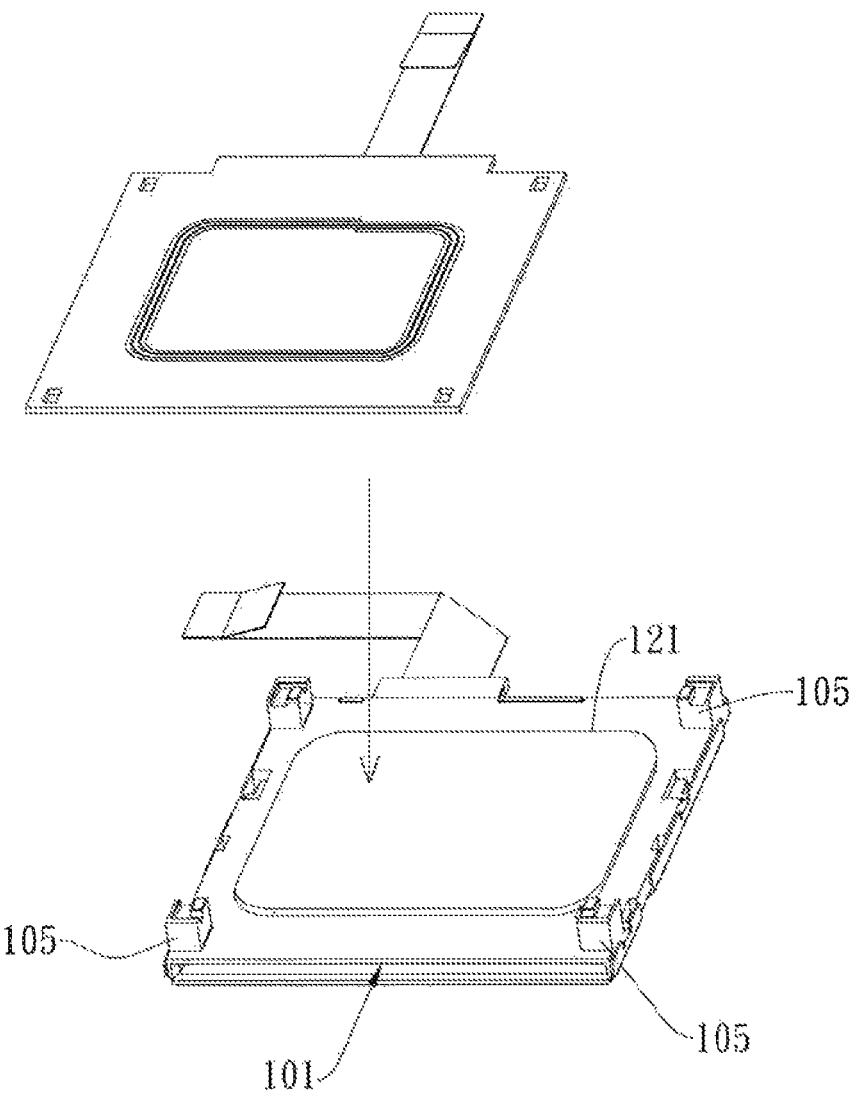
FIG. 2 is a perspective view of a base and a wave absorption material after assembly; and, FIG. 3 is a perspective view of a base and an RFID module after assembly.

Again referring to FIG. 1, the wave absorption material 121 is a thin sheet material, and its shape is preferably designed for suitably laying flat on top of the upper surface of the base 101 and covering the upper surface of the base 101. The wave absorption material 121 is configured for improving the induction performance of the RF antenna portion of RFID module 141 located above. The wave absorption material 121 may be made in a form of wave absorption patch, which utilizes the adhesive layer attached thereon to be adhered on top of the upper surface of the base 101, as shown in FIG. 2.

In an embodiment of the present invention, the RFID module 141 is composed of a circuit board 143, an antenna loop 145 and a second transmission element 147. The circuit board 143 is integrated with various elements for operating RFID functions, such as RF chip, RF circuit (not shown). The antenna loop 145 may also be a part of the circuit board 143, which is coupled to the RF circuit in the circuit board 143, and electrically connected with the RF chip for transmitting induction signal. The four corners of the circuit board 143 are formed with four rectangular through-holes 149. The through-holes 149 correspond to the raised buckles 107 on the support portions 105 and are used in the following assembly procedure with the base 101. Moreover, the second transmission element 147, such as a flexible flat cable (FFC) or a flexible printed circuit (FPC), is connected to the rear side of the circuit board 143 for transmitting the RFID data signals into or out of the circuit board 143. In other embodiments, the second transmission element 147 is a solder wire. In this configuration, the entire base 101 is directly fixed to a circuit board or other connector (not shown) by a wire bonding method. The first transmission element 113 can be other types of connectors that achieve a plate-to-plate connection and transmission aspect.

Figure 3:
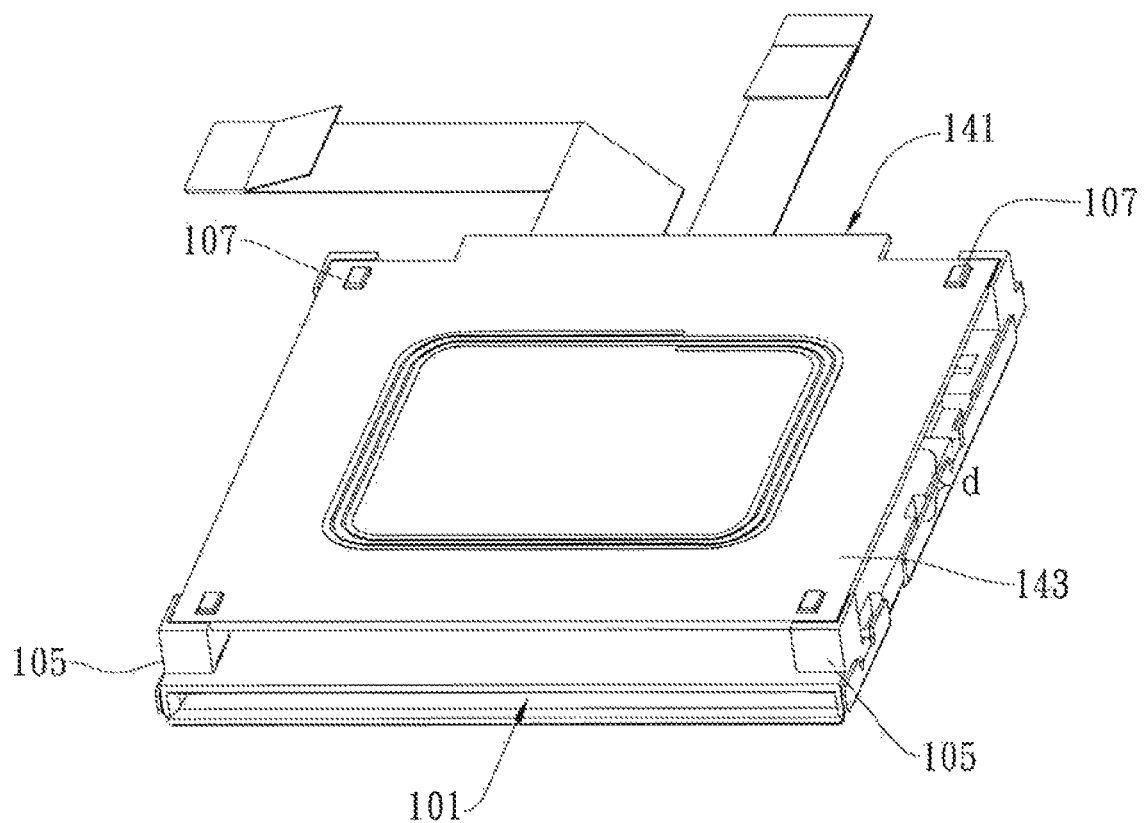

Next, referring to FIG. 3, the diagram is a perspective view of a base 101 and an RFID module 141 after assembly. As shown, the RFID module 141 of the smartcard connector 100 is configured on the support portions 105 of the base 101. The slots 109 on the support portion 105 as shown in FIG. 1 is conformed with the shape of the four corners of the circuit board 143, such that the circuit board 143 is fixed with the four support portions 105. At this position, the four through-holes 149 as shown in FIG. 1 of the circuit board 143 are respectively aligned with the raised buckles 107 on the four support portions 105, such that the raised buckles 107 may be locked with the through-holes 149, and further fix the circuit board 143 with the base 101 in a snap-in manner.

After completion of assembly, as shown in FIG. 3, the circuit board 143 will be parallel to the wave absorption material 121 and separated by a predetermined distance, such as the interval d shown in FIG. 3, depending on the lengths of the support portions 105. The antenna loop 145 and the wave absorption material 121 are separated by a distance, which may effectively improve the antenna induction performance of the RFID module 141. With such a design, the present invention may adjust the interval between the antenna loop 145 and the wave absorption material 121 by changing the length of the support portion 105 of the base 101, so as to achieve the optimized antenna induction performance for the RFID module 141.

The embodiments and the figures described in the specification are provided for the reader to have an universal understanding of each different embodiment of the present invention. These figures and descriptions are not intended to provide a complete description for all elements and features in the device and system of the structure or method described herein. By referring to the specification of the present invention, the skilled in the art of the present invention may further appreciate many other embodiments of the present invention, which are employed or developed from the disclosure of the present invention. The present invention may be changed with structural or logical replacement and change without departing from the scope of the present invention. For example, the shape of the base 101 of the smartcard connector according to the present invention is not limited to the cube shown in the figure, but possibly can be another rectangular parallelepiped. The wave absorption material 121 may also possibly have a shape and aspect other than the one shown in the figure. In the figures, although the first transmission element 113 and the second transmission element 147 described in the embodiments are represented as configuring on the same side of the smartcard connector, both elements may possibly be configured on different sides of the connector based on different designs of PCB board. Moreover, the figures are only used for representation, but not drawn in scale. Certain portions of the figures may possibly be enlarged for emphasis, and other portions may possibly be skipped. Thus, the disclosure and figures of the present invention may be construed as descriptive but not limited, which should be limited by the claims in the following context.

What is claimed is:

1. A smartcard connector with RFID module, which comprises:
   a base having an upper surface and a card slot for receiving a smartcard positioned below the upper surface;
   a wave absorption material positioned on the upper surface of the base;
   an RFID module positioned above the upper surface, supported by the base, and spaced from the wave absorption material;
   a first transmission element connected to one side of the base; and,
   a second transmission element connected to one side of the RFID module.

2. The smartcard connector with RFID module according to claim 1, wherein the base has at least one support portion and the RFID module has at least one through-hole through which the support portion extends to lock the RFID module to the base.

3. The smartcard connector with RFID module according to claim 2, wherein the support portion is positioned at a corner of the upper surface and the through-hole is positioned at a corner of the upper surface.

4. The smartcard connector with RFID module according to claim 2, wherein the support portion is formed with a raised buckle which extends through the through-hole to lock the RFID module to the base.

5. The smartcard connector with RFID module according to claim 1, wherein the first transmission element connects to one side of the base, the second transmission element connects to the same corresponding side of the RFID module.

6. The smartcard connector with RFID module according to claim 1, wherein the base has four support portions and the RFID module has four through-holes through which the support portions extend to lock the RFID module to the base.

* * * * *

UNITED STATES PATENT AND TRADEMARK OFFICE
CERTIFICATE OF CORRECTION

PATENT NO. : 8,939,378 B2  
APPLICATION NO. : 13/524373  
DATED : January 27, 2015  
INVENTOR(S) : Cheng-Wei Huang et al.

Page 1 of 1

It is certified that error appears in the above-identified patent and that said Letters Patent is hereby corrected as shown below:

Under (56) References Cited, U.S. Patent Documents, on the Title page of the Patent, please insert
--U.S. Patent Publication No. 2005/0106936 A1 issued to Chen, et al. published May 19, 2005--

Signed and Sealed this
Twenty-sixth Day of April, 2016

Michelle K. Lee
*Director of the United States Patent and Trademark Office*